No. 861,819. PATENTED JULY 30, 1907.
T. A. EDISON.
DISCHARGING APPARATUS FOR BELT CONVEYERS.
APPLICATION FILED JUNE 14, 1907.
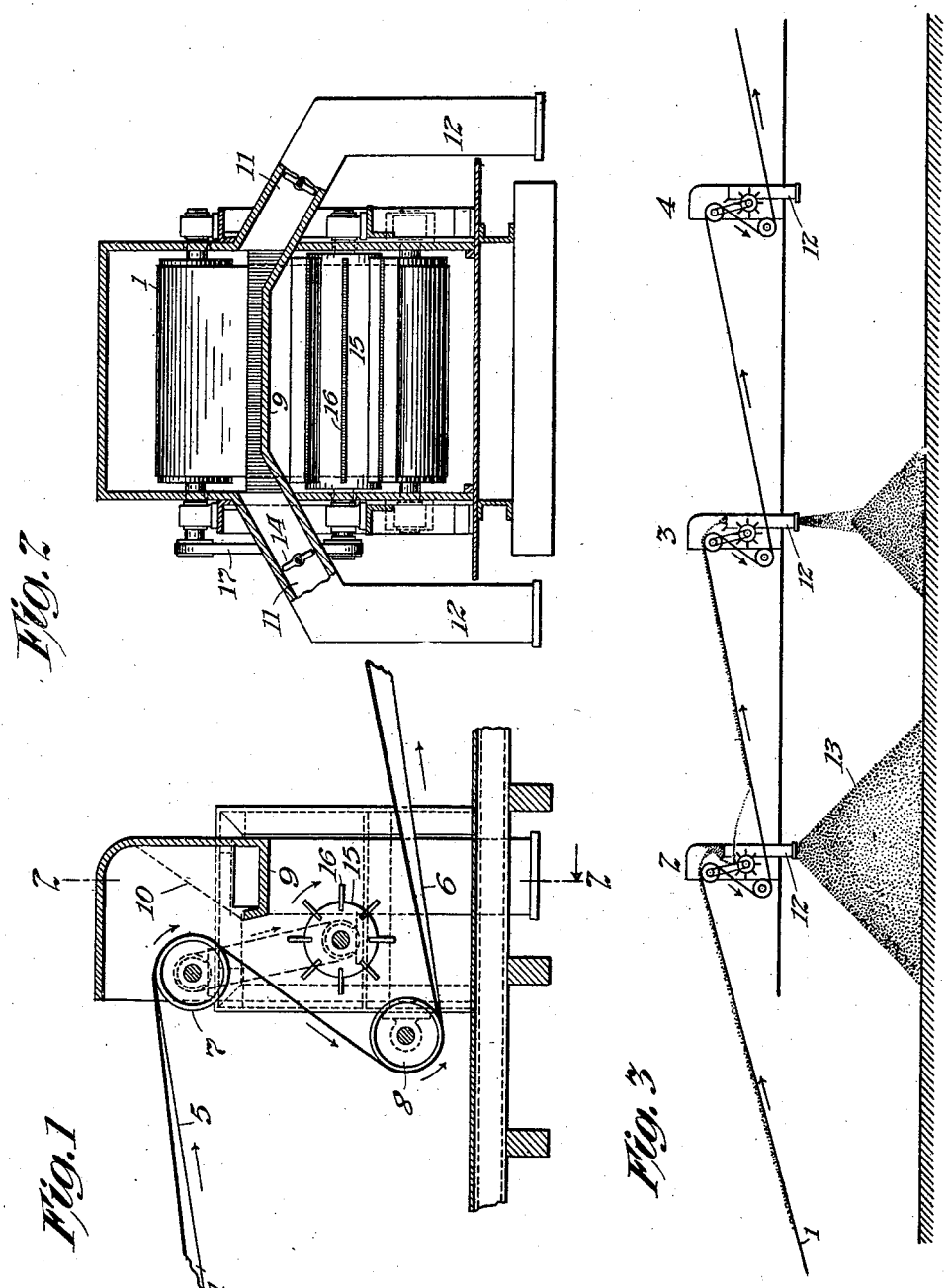

UNITED STATES PATENT OFFICE.

THOMAS A. EDISON, OF LLEWELLYN PARK, ORANGE, NEW JERSEY.

DISCHARGING APPARATUS FOR BELT CONVEYERS.

No. 861,819.      Specification of Letters Patent.      Patented July 30, 1907.

Application filed June 14, 1907. Serial No. 378,890.

*To all whom it may concern:*

Be it known that I, THOMAS ALVA EDISON, a citizen of the United States, residing at Llewellyn Park, Orange, county of Essex, and State of New Jersey, have invented a certain new and useful Discharging Apparatus for Belt Conveyers, of which the following is a description.

My invention relates to discharging apparatus for belt conveyers in which at each discharging station the belt is passed over supporting rollers so disposed as to form the belt in an S- or- Z- shape, whereby material may be discharged from the upper run of the belt through conveying chutes or may be discharged on to the lower run of the belt so as to be carried to the next station. In using belt conveyers of this type on an extensive scale in connection with the manufacture of Portland cement, I find that the belts become very rapidly worn, since at each discharging station the material falling from the upper to the lower run of the belt requires to be moved from a state of rest to the speed of the belt, which may be as high as 500 feet per minute.

The object of my present invention is to provide improvements in discharging apparatus of the type referred to, wherein objectionable wear on the belt will be overcome, and to this end the invention consists in interposing between the upper and lower runs of the belt at each discharging station a suitable projecting device by means of which the material falling from the upper run of the belt will be projected forwardly so that when it is received by the lower run of the belt its velocity will be substantially coincident therewith. The special form of projecting device which I prefer to employ for this purpose is a drum or roller provided with radial wings on its periphery for receiving and propelling material forward, and rotated by suitable connections from one of the supporting rollers over which the belt passes at each discharging station.

In order that the invention may be better understood, attention is directed to the accompanying drawing forming part of this specification, and in which—

Figure 1, is a longitudinal sectional view of the apparatus in its preferred form, at one of the discharging stations; Fig. 2, a cross-sectional view on the line 2—2 of Fig. 1, and Fig. 3, a diagrammatic view.

In these views corresponding parts are represented by the same numerals of reference.

1 represents a suitable endless conveying belt, which is shown in use in connection with three discharging stations 2, 3 and 4. I refer to the run 5 of the belt entering the discharging station as the upper run, and the run 6 of the belt leaving the same discharging station, as the lower run. At each discharging station the upper run of the belt passes over a pulley 7 and the lower run passes from a pulley 8. Any suitable and well known arrangement may be employed to give the belt a trough-shape, so as to facilitate the handling of the material. At each station I provide a shelf 9 on which the material may accumulate in a pile 10 (see dotted lines—Fig. 1), and extending out from each side of the shelf are chutes 11 having vertical legs 12 which discharge into a suitable stock house. From each of these legs the material will be formed into a pile 13 which when it becomes large enough, will close the mouth and fill up the legs 12 and chutes 11, so as to thereafter overflow the shelf 9 and fall upon the lower run to be carried on to the next station. If, however, it is desired to provide means at each station for cutting off the discharge of material thereat, each chute 11 may be provided with a suitable valve 14 (see Fig. 2) which may be closed when it is desired to cut off the discharge of material.

Heretofore with apparatus of this type the material from the shelf 9 falls vertically on the lower run 6 and requires to be started from rest by the belt, so as to thereby objectionably wear the belt, especially when the material is of a hard, erosive nature, like Portland cement. To obviate this defect, I interpose a device between the upper run 5 and the lower run 6 of the belt and by which the material falling from the upper run will be projected forwardly, so as to preferably coincide with the speed of the belt. This device is preferably a drum or roller 15 formed with radial wings or blades 16, and rotated in any suitable way, as for example by a belt 17 driven from the shaft of one of the rollers 7 or 8, the surface speed of the drum being preferably about the same as that of the belt, so that the material falling from the shelf 9 on to the drum 15 will be projected forwardly (see Fig. 3) so that when it reaches the belt its movement will be substantially coincident therewith.

Having now described my invention, what I claim as new and desire to secure by Letters Patent is as follows:

1. In a discharging apparatus for belt conveyers of the type described, the combination with the upper and lower runs of a belt, means located between the upper and lower runs for receiving material discharged from the upper run and projecting it forwardly in the direction of travel of and upon the lower run, substantially as set forth.

2. In a dischaging apparatus for belt conveyers of the type described, the combination with the upper and lower runs of a belt, of a stationary shelf for receiving the material discharged from the upper run and means located beneath the shelf for receiving material discharged therefrom and projecting it forwardly in the direction of and upon the lower run, substantially as set forth.

3. In a discharging apparatus for belt conveyers of the type described, the combination with the upper and lower runs of a belt, of a roller located between the upper and lower runs for receiving material discharged from the upper run and projecting it forwardly in the direction of and upon the lower run, substantially as set forth.

4. In a discharging apparatus for belt conveyers of the type described, the combination with the upper and lower runs of a belt, of a roller located between the upper and lower runs for receiving material discharged from the upper run, projecting it forwardly in the direction of and upon the lower run and means for driving said roller from the belt, substantially as set forth.

5. In a discharging apparatus for belt conveyers of the type described, the combination with the upper and lower runs of a belt, of a roller located between the upper and lower runs for receiving material discharged from the upper run and projecting it forwardly in the direction of and upon the lower run, and a plurality of radial wings carried by said roller, substantially as set forth.

This specification signed and witnessed this 11th day of June 1907.

THOS. A. EDISON.

Witnesses:
FRANK L. DYER,
FRANK D. LEWIS.